Figure 22:
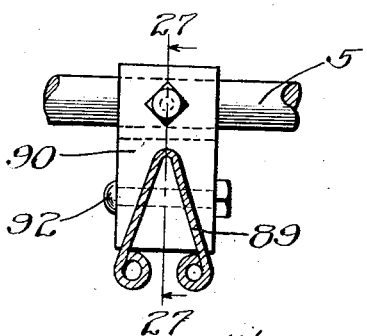

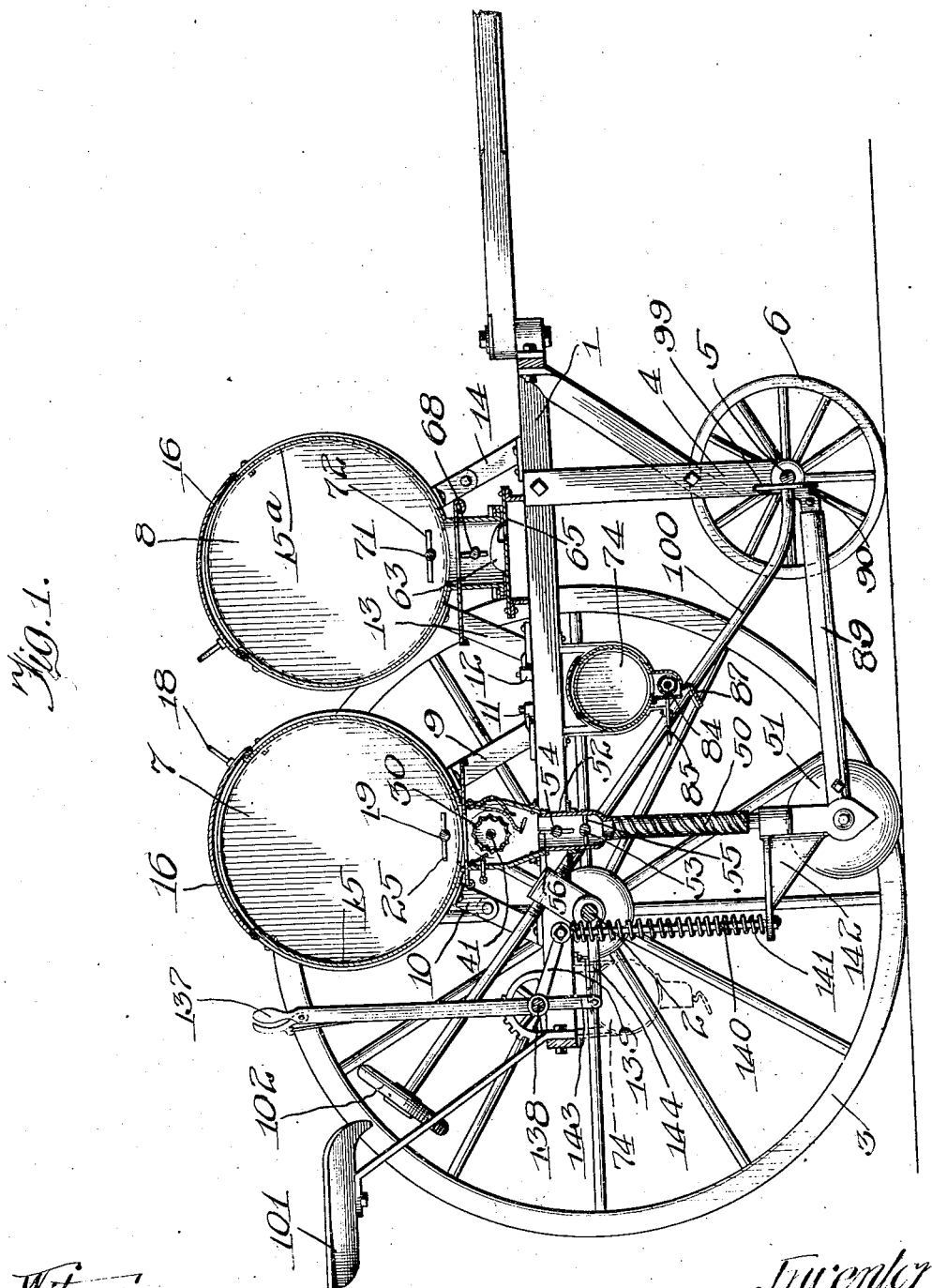

No. 867,451. PATENTED OCT. 1, 1907.
T. UMRATH.
PLANTING MACHINE.
APPLICATION FILED OCT. 26, 1906.
7 SHEETS—SHEET 2.
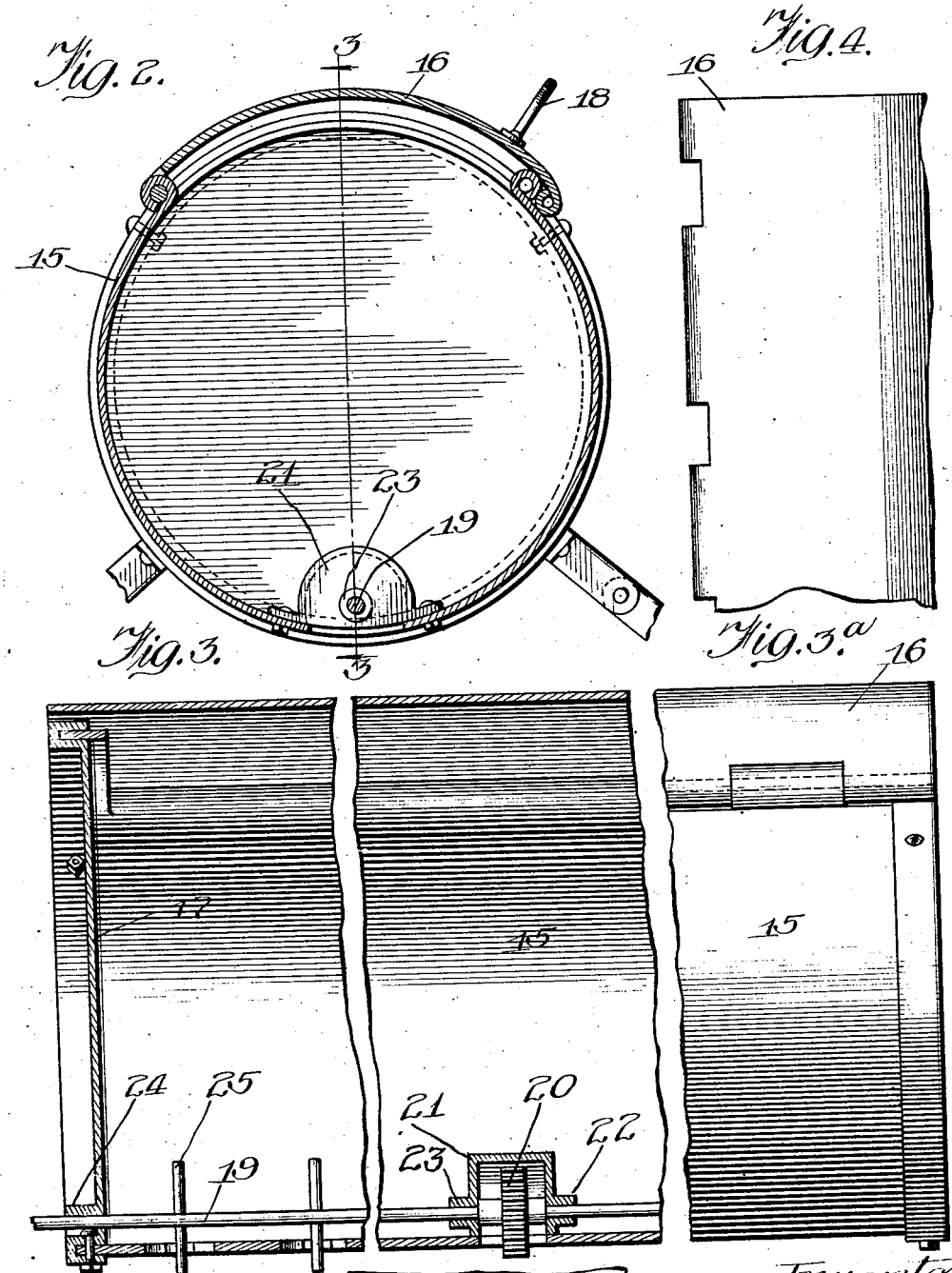

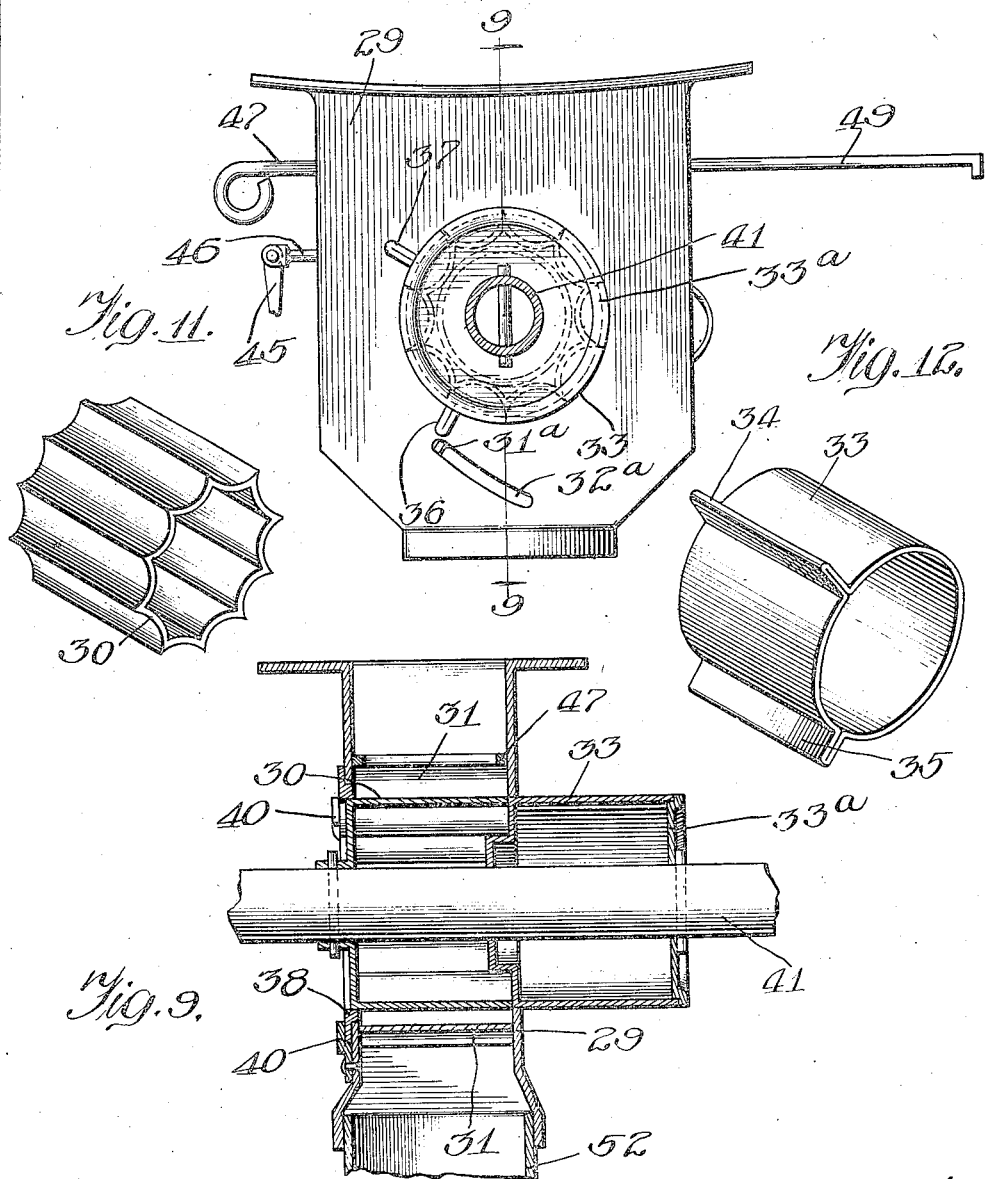

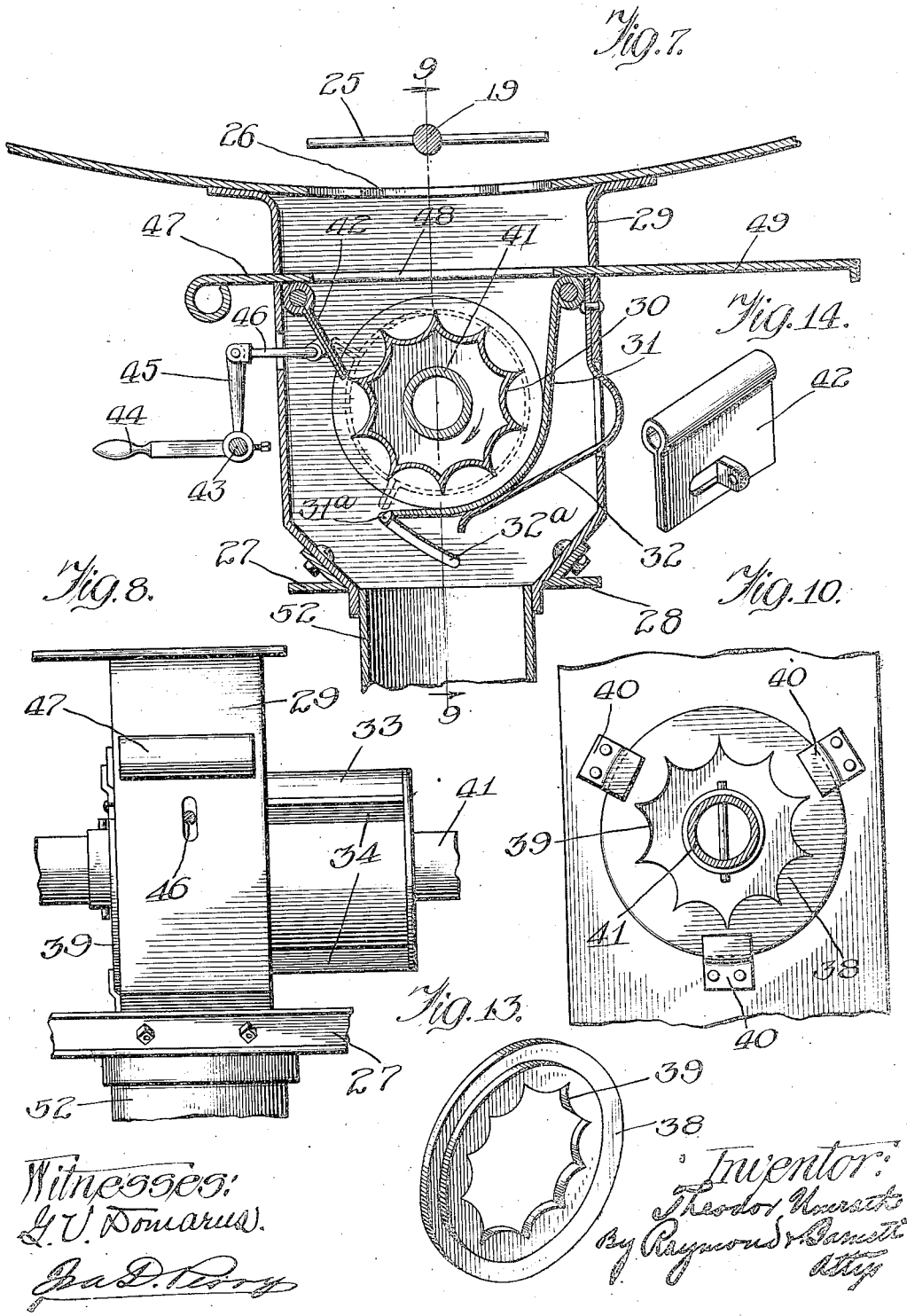

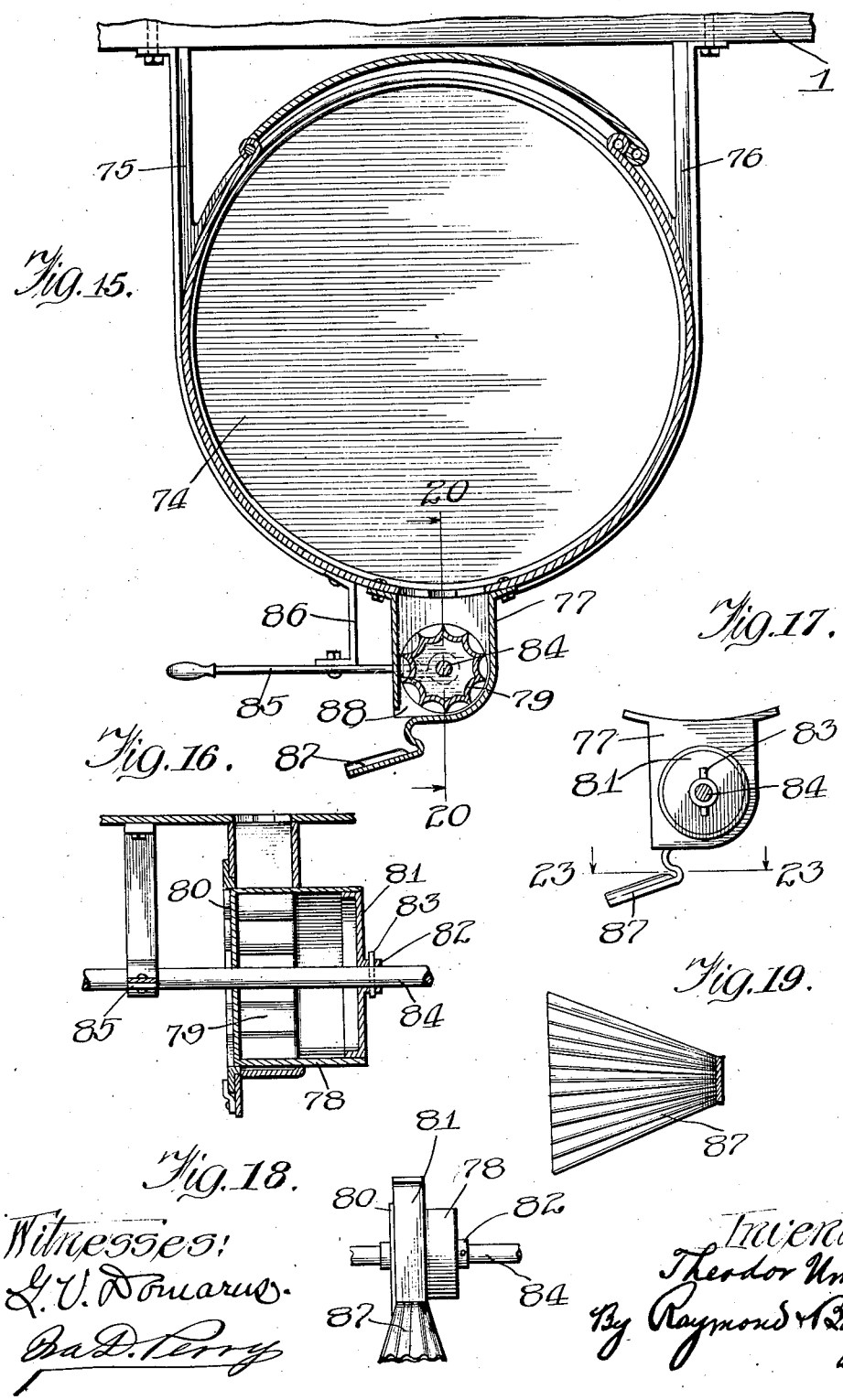

No. 867,451.

PATENTED OCT. 1, 1907.

T. UMRATH.
PLANTING MACHINE.
APPLICATION FILED OCT. 26, 1906.

7 SHEETS—SHEET 6.

Witnesses:
G. V. Domarus.
Jas. D. Perry

Inventor:
Theodor Umrath
By Raymond & Barnett
Attys

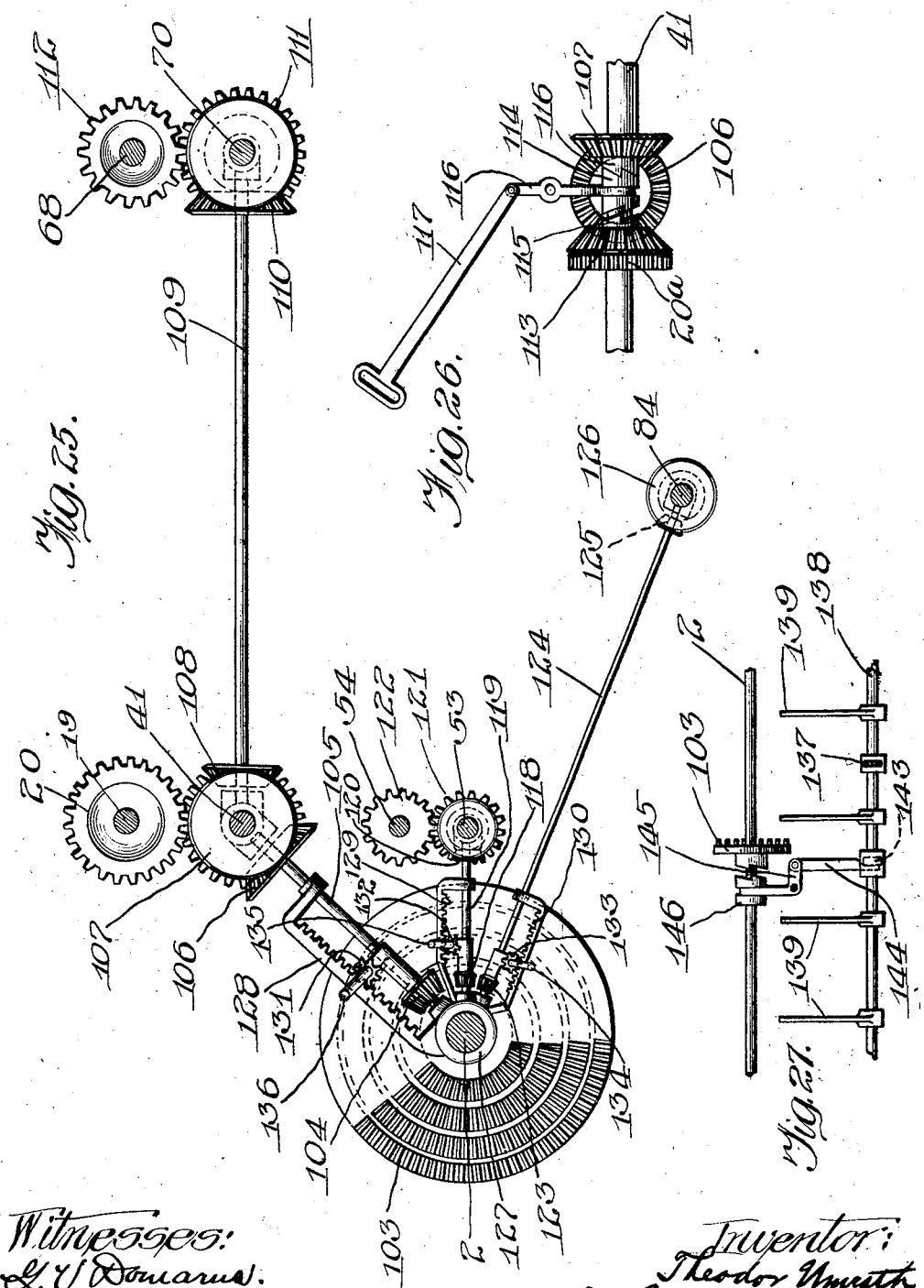

UNITED STATES PATENT OFFICE.

THEODOR UMRATH, OF CHICAGO, ILLINOIS.

PLANTING-MACHINE.

No. 867,451.  Specification of Letters Patent.  Patented Oct. 1, 1907.

Application filed October 26, 1906. Serial No. 340,682.

*To all whom it may concern:*

Be it known that I, THEODOR UMRATH, a citizen of Germany, residing at Chicago, in the county of Cook and State of Illinois, have invented certain new and useful Improvements in Planting-Machines, of which the following is a specification.

This invention relates to improvements in machines for planting grain, corn, beans, etc., and particularly to that type of planting machine which is known as a seed drill.

The object of the present invention is the general improvement of machines of this class and, at the same time, the cheapening of the construction of the same. This and such other objects as may hereinafter appear are accomplished in the machine shown in the drawings and described herein.

Figure 20:
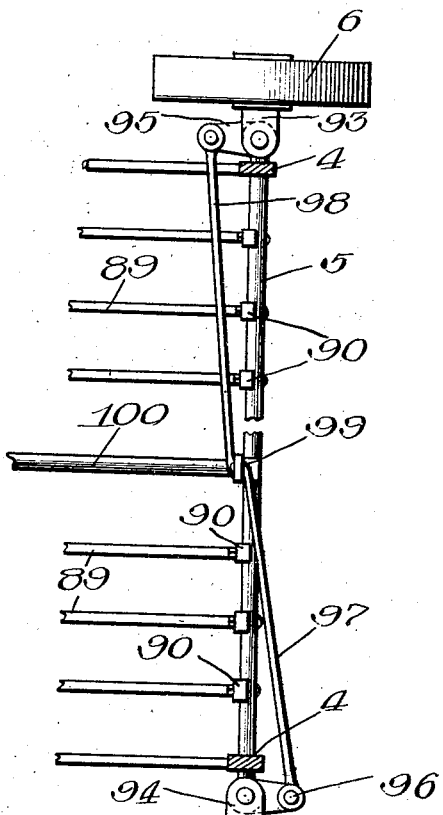
Figure 23:
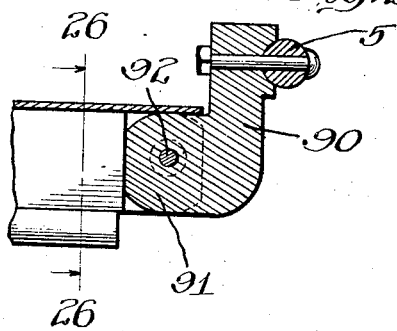
Figure 24:
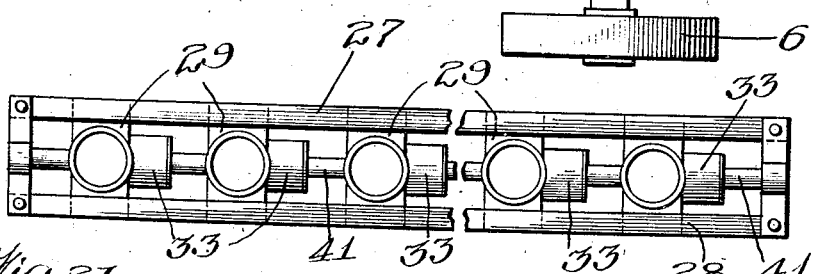
Figure 21:
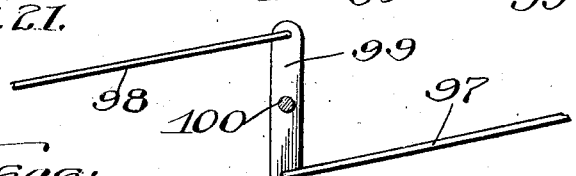

In these drawings—Figure 1 shows, in vertical section, a machine constructed in accordance with my invention. Fig. 2 is a vertical cross-sectional view of the seed receptacle. Fig. 3 is a broken view, showing in longitudinal, vertical section the seed receptacle, the section being taken on the line 3—3 of Fig. 2, looking in the direction indicated by the arrows. Fig. 3ᵃ is a broken, elevational side view of one end of the seed receptacle. Fig. 4 is a broken, plan view of the cover of the seed receptacle. Fig. 5 is a detail of a portion of the bottom of the seed receptacle. Fig. 6 is an elevational side view of one of the seeding devices. Fig. 7 is a central, vertical section of the same. Fig. 8 is an elevational edge view of the same. Fig. 9 is a vertical, sectional view of the same, the section being taken on the line 9—9 of Figs. 6 and 7. Fig. 10 is a broken, elevational view of the seeding device, showing the side opposite that shown in Fig. 6. Fig. 11 shows, in perspective, the feed-wheel or cylinder detached from the feed cup. Fig. 12 shows, in perspective, a detail of the follower. Fig. 13 is a perspective view of a disk or rosette adapted to close the end of the casing of the seeding device. Fig. 14 is a perspective view of a gate or valve used in the seeding device. Fig. 15 is a cross-sectional view of a grass seed attachment, which is adapted to be removably secured to the frame of the machine, and is designed to be used when it is desired to sow grass seed and grain at the same time. Fig. 16 shows, on an enlarged scale, in vertical section, the device for feeding grass seed, the section being taken on the line 20—20 of Fig. 19, looking in the direction indicated by the arrows. Fig. 17 shows, in side elevation, this seed-feeding and scattering device detached from the seed box. Fig. 18 shows the feeding and scattering mechanism in edge elevation. Fig. 19 shows, in plan on an enlarged scale, a device which is adapted to spread the stream of falling grass seed so that this seed will be distributed evenly over the ground. Fig. 20 shows a plan view of the forward portion of the machine and illustrates the mechanism whereby the machine is steered. Fig. 21 is a detail of a portion of the steering mechanism. Figs. 22 and 23 are details of portions of the machine, showing the mode of connecting the drag bars and the feed-shoes to the front axle so as to maintain the shoes in proper position. Fig. 24 is an inverted plan view of a frame carrying a series of seeding devices, this frame and its attached seeding devices being removably secured to the frame of the machine so as to be readily detached therefrom and lifted out, whereby it is possible to furnish the machine with seeding devices of different types. Fig. 25 shows, in detail, means whereby the various seed and fertilizer feeding mechanisms are driven. Fig. 26 shows, in detail, the means for reversing the direction of rotation of the shaft which extends through the series of grain-feed devices, this reversal being effected for a purpose hereinafter explained; and Fig. 27 is a detached detail of parts of the machine, illustrating the means whereby the moving parts of the machine are thrown into, or out of, action.

In the several figures of the drawings, 1 indicates the frame of the machine.

2 is the main axle or shaft, having upon its ends the wheels 3 and carrying also suitable means for driving the various moving parts of the machine.

The forward part of the frame is provided with downwardly extending standards 4, through which extends an axle 5, this axle being stationary. At each end of the axle 5, (see Fig. 20), is a swiveled extension 93 of the axle, each of the extensions carrying a wheel 6. Means are provided, and will be hereinafter described, whereby these front wheels may be swung in a horizontal plane to steer the machine.

Above the frame 1 of the machine, and carried thereby, are receptacles or hoppers 7 and 8 adapted to contain grain, seed or fertilizer. Each of these receptacles is supported upon four legs, two of these legs being jointed so as that the receptacle may be tipped over when it is desired to pour out the contents. The leg 9 of the receptacle 7 is formed in one piece, while the leg 10 is formed with a hinged joint about midway its length. A snap-bolt 11 is secured to the frame of the machine and adapted to catch over the foot of the leg 9 when the receptacle 7 is in the position shown in the drawings, but to be drawn back so as to release said foot when it is desired to tip the receptacle back and to pour the contents therefrom. The receptacle 8 is similarly provided with means, consisting of a snap bolt 12, adapted to engage the foot of the leg 13 when the receptacle 8 is in normal position, but to be released when the receptacle 8 is to be tipped back. The jointed leg 14 is constructed substantially similar to the leg 10.

The receptacles 7 and 8 are formed of sheet metal, preferably galvanized iron or steel, bent to the form of a hollow cylinder 15, 15ᵃ, having an opening extending along one side and adapted to be closed by a curved cover 16. This cover is also formed of sheet metal and is hinged along one of its edges to one of the edges of the box 15. The ends of the boxes 15, 15ª, are closed by sheet metal disks 17, (Fig. 3), the edges of the box 15 and the edge of the plate 17 being formed to overlap and form a tight joint in a familiar manner. A receptacle of this form may be easily, rapidly and cheaply produced and has the advantage, in use, that water is shed from the curved upper side. In grain drills, as heretofore constructed, the seed receptacles have generally been made of wood and provided with flat wood covers. The objection to such covers is that when the machine is left out-of-doors and exposed to the weather, rain and sun affect the cover, warping it out of shape and causing it to less completely close the box against the admission of water and the consequent rusting and damaging of the parts of the mechanism within the receptacle, as well as the spoiling of any seed which may be left in the box.

The cover 16 is provided with a convenient handle 18, whereby it may be readily turned back. Extending through the seed box is a shaft 19, midway between the ends of which is a gear-wheel 20 secured to this shaft. This gear 20 is covered by a housing 21 which has bearings 22 and 23 for supporting the shaft. Other suitable bearings 24 are provided at each end of the receptacle. The shaft 19 is provided with a series of pins 25. During the working of the machine this shaft, and the pins carried thereby, rotate and break up the mass of seed, grain or fertilizer, which is contained in the receptacle, before it passes out through the openings in the bottom of the receptacle. These openings 26 are arranged in a series along the bottom of the receptacle and permit the passage of seed or fertilizer therefrom to the feed-mechanisms.

In Fig. 5 is shown a detail of a portion of the bottom of the receptacle and one of the openings therethrough. This opening is of elongated form so that the pin 25 may revolve therein.

In grain drills, as heretofore constructed, the grain-feed devices or fertilizer-feed devices have usually been made as a part of the receptacle which is to contain the material to be fed, or have been secured to the receptacle so that when the receptacle is tipped back the series of feed-devices arranged along the bottom of the receptacle have been carried therewith. In a machine constructed according to my invention a series of seed or grain feed-devices is arranged along a removable frame, this frame being adapted to be secured in place to the frame of the machine, or to be detached therefrom with the whole series of feed-devices, and to be replaced by a similar frame having arranged therealong a series of feed-devices adapted for use with fertilizer. There are in common use several different forms of grain-feed devices adapted to be used upon a machine of this character. It is found that some farmers prefer one form of feed-device while others prefer a different form and, for certain kinds of seed, one type may offer advantages over another. One of the objects of my invention is to provide means whereby it is possible, with a very small expenditure of time and labor, to change from one type of feed to another, either that the series of grain-devices may be replaced by a series of fertilizer-feed devices, or that one type of grain-feed or fertilizer-feed device may be substituted for another. To this end, I arrange, as shown in Fig. 8, a series of seed-feed devices 27 along a frame 28. I also arrange on a suitable similar frame a series of feed-devices adapted to feed fertilizer. In Figs. 6 to 14, inclusive, are shown details of a single seed-feed device of a preferred form. Referring particularly to these figures, 29 is an outer casing formed of sheet metal, preferably galvanized iron or steel, and having a flaring, open top and a contracted, open bottom. The top is adapted to be closed by the bottom of the grain receptacle, when the latter is in normal position, but, when this receptacle is tipped back, the top of the casing 29 is open and free access is given to the interior of the same. Revolving in the casing 29 is a feed-wheel 30 which may be stamped or pressed out of sheet metal. Between the wheel 30 and the back of the casing 29 is a curved plate 31, this plate being hinged at its upper edge and pressed toward the feed-wheel 30 by a spring 32. The plate 31 is formed with a projection 31ª which moves in a slot 32ª in the side of the casing as the plate 31 is swung back. The forward end of this slot forms a stop to limit the forward movement of the plate. The stream of seed falls upon the wheel 30 and, when the wheel is rotating in the direction indicated by the arrows in Fig. 7, is carried through the passage between the wheel 30 and the plate 31.

It is found in practice that stones or other foreign bodies sometimes fall into the feed-device with the grain and, unless means are provided whereby these stones may pass through the device instead of becoming lodged therein, some part of the mechanism will be broken. In the device herein shown, the passage of a stone through the device will merely force back the plate 31 against the forward thrust of the spring 32, and the stone will be permitted to go through the device without doing any damage.

33 is a closing cylinder or follower provided with wings 34 and 35. This cylinder is placed with one of its ends abutting the end of the wheel 30 and is inserted into the casing 29 through an opening in the side thereof, this opening being formed with slots 36 and 37 extending radially from the center of the opening. On the opposite side of the casing 29 is a circular opening adapted to be closed by the disk or rosette 38. This disk is provided with an opening 39 having the proper contour to permit the feed-cylinder 30 to slide back and forth through this opening. The feed-wheels 30 and the closing cylinders 33 of the series of feed-devices are all mounted upon a common shaft. By the movement of this shaft in the direction of its length, the portion of the width of the feed-wheel 30 which is within the casing 29 and in operation is increased or diminished, and thereby the width of the opening through which the seed or grain may pass is regulated, as is well known in this art.

The disk 38 is held in place over its opening by three or more lugs 40 which are riveted, or otherwise conveniently secured, to the side of the casing. The lower portion of the casing 29 is made of such form as to give a contracted opening through which the seed passes on its way to the furrow opening shoes, or disks.

Hinged at the upper part of each casing or cup 29 is a gate 42 adapted to swing toward or away from the feed-wheel 30, whereby the opening between the lower edge of this gate and the points of the wheel 30 may be adjusted.

It is found in the use of devices of this character that the seed or grain which is being fed will sometimes become clogged in the upper part of the casing of the feed-device. When this occurs the feed-device becomes inoperative and it is necessary to stop the machine and break up the clogged mass of seed. It is also found that when this type of seed-feeding device is used with large seed, such as certain varieties of large beans, especially if the latter have been soaked and swollen, as is often designedly done, these large seeds are liable to be crushed between the points of the feed-wheel 30 and the plate 31 if the feed-wheel is made to rotate in the usual direction, as indicated by the arrow in Fig. 7. To overcome these difficulties I propose to rotate the wheel 30 in the opposite direction, when these conditions occur, so that the seed, instead of passing through the opening between the wheel 30 and the plate 31, will be made to pass over the opposite side of the wheel 30 and will fall through the passage between this wheel and the gate 42. Means are provided whereby this reversal of the direction of rotation may be quickly made by manually-operated means, to be hereafter described.

Extending across the machine is a shaft 43 (see Fig. 7) supported in proper bearings and having a handle lever 44 secured thereto at some convenient point. Extending upward from this shaft 43 is a series of levers 45, each of these levers having connected to its upper end a short spindle 46, which spindle extends into the casing 29 and is connected to the gate 42. By the movement of the handle 44 up or down, the shaft 43 is rotated and the levers 45 and spindles 46 transmit this movement to all of the gates 42, closing them or opening them simultaneously.

It sometimes becomes necessary to throw out of operation a part of the feed-devices. This will occur when it is desired to plant seed in rows a greater distance apart than that provided for by the machine. In this case the slide 47, with which the feed-device casing is provided, will be closed upon such feed-devices as it is desired to have inoperative. This slide 47 is provided with an opening 48 which is in alinement with the opening 26 in the bottom of the seed receptacle when the slide is pushed in, as shown in Fig. 7. By withdrawing the slide 47 as far as possible, this opening 48 is closed by the end 49 of the slide.

Extending downward from the frame 1 of the machine is a series of flexible feed-pipes 50, at the lower end of each of which may be provided a furrow-opening disk 51 of any approved form, or, if desired, some form of shoe such as is commonly used upon machines of this type. At the upper end of each of the feed-pipes 50 is a casing 52 having its upper end adapted to fit into the lower end of the feed-device casing 29, as clearly shown in Fig. 7. Within this casing 52 are two shafts, 53 and 54, respectively. Each of these shafts has secured thereto a gate, 55 and 56, respectively. The shafts 53 and 54 are so geared together that when the gate 55 is in the horizontal position the gate 56 will be in the vertical position, and vice versa. It is sometimes desired to plant the seed in hills instead of continuous rows. When the gate 56 is horizontal, the seed will fall upon the same and will be collected at this point.

When this gate 56 is rotated to the vertical position, the seed collected thereupon will be dropped onto the gate 55, which will then be in the horizontal position and will be there held until this gate turns to the vertical position, when all of the seed collected at this point will be dropped at the same time into the feed-pipe 50. When it is desired to plant in continuous rows the casings 52 will be removed with the shafts 53 and 54 and a longer feed-pipe 50 will be substituted for the one employed when the planting is done in hills, this long feed-pipe fitting into the bottom of the feed-device casing 29.

Mounted upon a frame consisting of angle irons 57 and 58, is a series of fertilizer-feed devices, each of these devices having a casing 59 formed of sheet metal, preferably galvanized iron or steel. The bottom of this casing 59 is formed by a shallow box 60 having gear-teeth 61 formed around its upper edge, these teeth being pointed upward. This box 60 is formed so that its upper edge overlaps an out-turned flange 62 on the bottom of the casing 59 and is adapted to turn upon said casing without being detached therefrom. Within the casing 59 and formed integral with the bottom 60, is a cap 63, this feed-cap having an opening 64 through which, when the cap is rotated, the fertilizer is forced into the space below the cap. Below the casing of the feed-device is a plate 65 upon which the bottom 60 rests, and in contact with which the latter revolves. This plate is formed with an opening 66 through which the fertilizer is forced as is well understood in this art. The bottom 60 and cap 63 are preferably formed of a single piece of sheet metal, such as galvanized iron, and may be cheaply and rapidly formed by stamping processes. Means, such, for example, as the bolt 67, may be provided for holding the bottom and cap connected to the plate 65, and centering the parts relatively to each other.

Extending through the series of fertilizer-feed casings is a shaft 68, this shaft being driven by means hereafter described, and having arranged therealong a series of gear-wheels 69, these gear-wheels meshing with the teeth 61 upon each of the revolving fertilizer-feed bottoms, and imparting rotation to the same. Within each of the fertilizer-feed casings, this shaft 68 is provided with a series of pins 70, the function of which is to stir up the fertilizer and prevent clogging of the same in the feed-device, and also to cause the fertilizer to be discharged in a finely-divided condition so that it will be evenly distributed over the ground. Revolving within the fertilizer box and immediately over the feed-device is a shaft 71, this shaft being provided with a series of pins 72 adapted to stir up the material as it passes downward into the feed-device.

The feed-device is provided with a slide 73 having an opening 73ª through which the fertilizer may pass when the slide is thrust in. When it is desired to use only a portion of the fertilizer-feed devices, such of these as are not to be used may be shut off by drawing out the slides.

The upper portion of each of the casings 59 is adapted to be closed by the bottom of the fertilizer box when the latter is in the position shown in Fig. 1, but when this box is tipped over upon its hinges in the legs 14 these casings 59 are opened and access is given to the interior of all of the fertilizer-feed devices.

In fertilizer-feed devices as commonly constructed, the cap 63 is revolved from a shaft which extends horizontally below the feed-device and which is provided with a gear-wheel fixed thereon, this gear-wheel meshing with the gear connected with the revolving cap. The objection to such a form of drive is that the fertilizer falling from the bottom of the feed-device becomes lodged on the shaft and works its way into the gears, clogging these parts and interfering with the operation of the machine. As herein shown, I have provided means whereby the inter-engaging gearing is not placed under the feed-device, but is located in such a position that no fertilizer can fall upon the same and interfere with the proper working of the machine. At the same time, it is possible to provide the shaft which drives this part of the machine with means for stirring up the fertilizer and keeping the same in a loose condition, because this shaft extends horizontally through the casing of the feed-device.
It is sometimes desired to sow grass seed with grain. The receptacle for containing this seed may be very much smaller than that for the grain. In my grain drill I provide a small cylindrical receptacle 74 (see Figs. 1 and 15) which is constructed substantially similar to the receptacles 7 and 8 and will not be described in detail. This receptacle 74 is hung, by means of hangers 75 and 76, from the bottom of the frame 1 and may be placed in front of the grain tubes 50, as shown in Fig. 1, or, if desired, may be located at the rear of these tubes, as shown in dotted lines in this figure. Secured to the bottom of the receptacle 74 is a casing 77 containing a cylinder 78 having about one-half of its length formed so as to form a feed-wheel 79, similar to that shown in Fig. 11. This cylinder 78 is pressed from a piece of sheet metal and has one of its ends closed at 80 and its opposite, or outer end, adapted to be closed by a disk 81. The disk 81 is formed with a projecting portion 82 provided with a pin 83 which secures this portion to the shaft 84. The shaft 84 extends through the series of cylinders 78 and is so mounted in its bearings as to have longitudinal, as well as rotary, movement. When it is desired to close the grass-feed devices more or less, so as to regulate the amount of grass seed which is discharged therefrom, this shaft 84 may be given movement in the direction of its length by means of a hand-lever 85, this lever being pivoted at a point intermediate its length to a bracket 86 secured to the bottom of the grass seed receptacle 74. The opposite end of this lever is secured to the shaft 84. The bottom of each of the casings 77 is provided with a fan-shaped spreader or scatterer 87, which may be pressed from a piece of sheet metal, upon which the seed, as it emerges from the opening 88 in the lower portion of the casing 77, falls. The function of this spreader 87 is to cause the seed falling thereupon to be distributed over the ground instead of dropping in a row.

Extending forward from each of the journals of the furrow-opening disks 51 is a brace 89, the forward end of each of these braces being connected to a bracket 90, these brackets being secured to the forward axle 5. Each of these braces consists of a strip of sheet metal bent into the form of an inverted V, with the lower edges curved inward, as shown in detail in Fig. 26.
This form of brace is very strong and is cheaply made, as well as of light weight. The forward end of each of the braces 89 is pivotally secured to a lug 91 upon the bracket 90 by a bolt 92, the lug 91 being of inverted V-shape to receive the end of the brace 89. When it is desired to remove the planting shoes, as, for instance, when the machine is to be used for fertilizer only, the brackets 90 may be readily detached from the front axle.

In the use of grain drills it is often found that the planting is not done in straight rows because of the difficulty of guiding the horses in a straight line. I propose to overcome this difficulty by so constructing the machine that it may be guided or steered independently of the movement of the horses, so that if the horses, to avoid a stone or stump, or for any other reason, move out of the direct line in which the machine is traveling, the operator may, by the manipulation of suitable steering means, keep the machine moving in a straight line. To this end I provide the axle 5 with swiveled extensions 93 and 94, each of these extensions having upon its outer end a bearing for a wheel 6. The extensions 93 and 94 are provided with lugs 95 and 96, respectively. To each of these lugs are connected one end of a rod, 97 and 98, respectively. The opposite ends of these lugs are connected to a cross-bar 99, the latter being secured upon the lower end of a steering post 100. This steering post 100 extends upward and backward to a point near the seat 101 and is provided with a hand wheel 102, which may be grasped by the driver. When the wheels are turned to such a position that the machine will not move in a straight line, the turning of the steering post 100 will cause the extensions 93 and 94 to swing on their pivots in an obvious manner.

In Fig. 25 is shown a differential gear-disk 103, this disk being provided upon one of its sides with a plurality of series of teeth arranged concentrically around the center of rotation of the disk, each of these series of teeth being at a different distance from the center. Adapted to engage these teeth is a gear 104, this gear being so arranged as to be moved toward or away from the center of the disk 103 and to be in mesh with any desired series of teeth upon said disk. By this means the speed of rotation of the gear 104 may be varied, and the speed of rotation of the shaft 105 which carries this gear 104 is regulated. This shaft 105 extends upward and forward and has mounted thereon, near its forward end, a bevel-gear 106, adapted to mesh with a bevel-gear 107 mounted upon the shaft 41 which extends through the series of grain-feeding devices. Also fixed on the shaft 41 is a gear-wheel 20ª (see Fig. 26,) meshing with the gear 20 on the shaft 19 which extends through the seed box 7. (See Figs. 1 and 7). Meshing with the bevel-gear 107 is a bevel-gear 108 mounted on a forwardly extending shaft 109, and upon the forward end of this shaft is a bevel-gear 110 meshing with a bevel-gear 111, this last-named gear being mounted upon the shaft 71 which extends through the series of fertilizer-feed devices, and which carries the series of gears 69, meshing with the teeth 61 arranged around the upper edge of the box 60 which forms the bottom of the casing 59 of the fertilizer-feed mechanism. Meshing with the gear 111 is a gear 112, this gear being secured upon the shaft 68 which revolves in the fertilizer receptacle 8. The gear 113, (see Fig. 26), is similar to the gear 107 and likewise meshes with the gear 106. The gears 107 and 113 are loosely mounted upon the shaft 41 and, by reason of their being in engagement with the gear 106 upon opposite sides of the center of the latter, revolve in opposite direction.

Mounted upon the shaft 41 is a clutch 114 adapted to have sliding movement in a direction lengthwise of the shaft 41, but secured so as to rotate with this shaft.

Each of the gears 107 and 113 is provided with a notched hub, 115 and 116, respectively, adapted to engage suitable notches upon the clutch 114. By throwing the clutch 114 into engagement with either one or the other of the gears 107 or 113, the shaft 41 has imparted to it, through the clutch 114, movement in one direction or the other, depending on which of these gears is connected through the clutch with the shaft. Means are provided for manually throwing the clutch 114 in either direction, which means may conveniently consist of a lever 116 pivoted intermediate its ends and having one of its ends connected with the clutch 114 and its opposite end connected with a rod 117, this rod extending to a point conveniently accessible to the driver and having a handle upon its end. When it becomes necessary to reverse the direction of rotation of the seed feed shaft to break up clogged masses of seed, as hereinbefore explained, this reversal may be very quickly accomplished, so that there will not be a space of any considerable width left unplanted during the interval in which the feed-wheels are being reversed.

A gear 118 is arranged to mesh with teeth upon the disk 103, this gear being mounted upon a shaft 119, which shaft extends forward and carries upon its forward end a bevel-gear 120. This gear 120 meshes with a gear 121 which is fixed upon the shaft 53 (see Fig. 15). Mounted upon the shaft 54 is a gear 122 which meshes with the gear 121. Meshing with the teeth on the disk 103 is another gear 123 mounted upon a shaft 124 which extends forward and has upon its forward end a gear 125, this gear meshing with a gear 126. The gear 126 is fixed upon the shaft 84 (see Figs. 1, 15 and 16), extending through the grass seed feed-devices.

Means are provided whereby the gears 104, 118 and 123 may be moved toward or away from the center of the disk 103, whereby the speed of rotation of these gears, and the shafts and mechanism driven thereby, may be regulated. Extending radially from the bearing 127 of the disk 103 are three brackets, 128, 129 and 130, respectively. These brackets are provided with teeth, and engaging these teeth are pinions, 131, 132 and 133, respectively, these pinions being carried by sliding members constituting bearings for the gears 104, 118 and 123. When it is desired to shift these gears along their respective shafts toward or away from the disk 103, these pinions may be rotated by means of the handles 134, 135 and 136, respectively. By this means I am enabled to conveniently regulate the speed of the different moving parts of the machine relative to each other.

The driver's seat 101 is mounted upon the frame in such a position that the main driving gear upon the main axle is before the driver and readily accessible to him. All the regulating means are placed so as to be within his reach without his leaving the seat.

A handle lever 137, (see Fig. 1), is secured to a suitable shaft 138, this shaft being supported in bearings. Also secured to the shaft 138 is a series of levers 139, each of these levers projecting forward and having connected thereto at its extreme end a rod 140, this rod extending downward and having sleeved thereon a spring 141. The lower end of the rod 140 extends through an opening in a bracket 142, this bracket being formed as a part of the feed-shoe and adapted to receive upon its upper side the pressure of the spring 141. The lower end of the rod 140 is provided with a nut or other convenient means for preventing the withdrawal of the rod 140 from the opening in the bracket 142. When the lever 137 is moved backward, or toward the driver, the feed-shoes or disks are raised from the ground against the tendency of the spring 141 to force these shoes or disks into the ground. Upon a forward movement being given to the handle 137, these shoes are permitted to engage the ground and are pressed thereinto by the springs 141. Also secured to the shaft 138 (see Figs. 1 and 27) is a downwardly extending lever 143 having secured to its lower end a link 144, this link extending forward and being connected at its end with one end of a bell-crank lever 145. The main driving disk 103 is loosely mounted upon the main shaft 2 and is provided with a hub adapted to be engaged by a clutch 146, this clutch being feathered or otherwise secured upon the shaft so as to rotate therewith, but permitted to move longitudinally thereon. The bell-crank lever 145 is adapted to engage the clutch 146 and, by its movement in one direction, to throw the clutch 146 into engagement with the hub of the driving disk 103 or, by its movement in the opposite direction, to disengage this clutch therefrom. The lever 137 may be provided with some convenient means for locking the same in position at any desired point in its swing about its pivotal point.

When the lever 137 is moved forward to lower the furrow opening shoes or disks into the ground, the movement of this lever will be transmitted through the lever 143, the link 144 and the bell-crank 145 to the clutch 146, thus throwing this clutch into engagement with the driving disk 103 and thereby coupling the moving parts of the machine to the rotating main shaft 2. When the lever 137 is moved in the opposite direction and the planting shoes or disks are thereby raised from the ground, the movement of the lever is transmitted through the lever 143, the link 144 and the bell-crank 145 to the clutch 146, causing the latter to be thrown out of engagement with the disk 103 and uncoupling the working parts of the machine from the main shaft. The utility and value of this part of my machine is apparent. It is found in practice that where separate and distinct means are provided for coupling the various moving parts to the main driving shaft and for raising and lowering the planting shoes or disks, the driver will often forget to adjust these various parts, so that with machines of the older types seed would sometimes be distributed over the ground and wasted when the machine was being driven along the road, or, on the other hand, the feeding parts of the machine might be placed out of operation while the planting means were permitted to drag along the ground and be injured thereby.

It is found that in different parts of the country, or in different countries, one form of seed-feed or fertilizer-feed device is well-known or preferred while another form is unknown, and it is also found that one form of such feed device is well adapted to the conditions of soil and methods of farming in one locality, while another form is better adapted for another locality. It is one of the valuable features of my machine that the seed-feed devices and fertilizer-feed devices are arranged in series along removable frames, these frames being adapted to be quickly and easily taken out and replaced by other frames fitted with feed devices of a different type. So, also, it may sometimes be desired to remove the seed-feed devices and substitute therefor fertilizer-feed devices. Thus, the machine might be supplied with one receptacle only, and in this case the machine would be driven over the ground once with fertilizer and again with seed.

I claim:

1. In a planting machine, the combination of a main frame, a receptacle supported thereby, a frame removably supported below said receptacle and carrying a series of feeding devices each communicating with said receptacle, and means for actuating said feeding devices.

2. In a planting machine, the combination of a main frame, a receptacle supported above said frame and provided with a series of openings through the bottom thereof, a frame removably secured to said last-named frame and carrying a series of feeding devices, each of these feeding devices having an open top which is adapted to be closed by the bottom of the receptacle without being connected therewith.

3. In a planting machine, the combination with a main frame, of a receptacle supported thereby, a removable frame carrying a feeding device provided with an open top, said receptacle having an opening in the bottom thereof adapted to communicate with the opening in the top of the said feeding device and said receptacle being hingingly supported so that it may be swung away from the feeding device.

4. In a planting machine, the combination of a main frame, a removable frame carrying a series of feeding devices having open tops, a receptacle above said main frame, said receptacle having a series of openings in the bottom thereof adapted to register with the open tops of the series of feed devices, said receptacle being horizontally supported that it may be tipped away from the feeding devices.

5. In a planting machine, the combination of a receptacle having a series of feed openings, said receptacle being tiltably supported, a series of feed devices having open tops adapted to register with said openings when the receptacle is in its normal position, but unattached thereto, a shaft rotatably arranged in said receptacle, and a series of pins carried by said shaft, said pins being arranged to rotate partly within the receptacle and partly within the feed device when the receptacle is in its normal position.

6. In a planting machine, a receptacle having a sheet metal bottom, said receptacle extending across the machine, and being provided with a plurality of elongated discharge openings stamped in said bottom and extending transversely of the length of said receptacle, a shaft carrying a plurality of pins, and means for causing said pins to travel within said cylinder and through said discharge openings, substantially as shown.

7. In a planting machine, the combination of a main driving axle, a frame, a series of feed devices supported by said frame, a shaft extending through said series of feed devices, two gear wheels loosely mounted upon said shaft, means for transmitting movement from the main axle to said gear wheels, said means causing said gear wheels to rotate in opposite directions, and a clutch longitudinally movable on the shaft and rotating therewith and adapted to be thrown into engagement with either of said gear wheels.

8. In a planting machine, a receptacle, means for feeding material from said receptacle, a main axle, a differential gear disk loosely mounted upon said axle, power-transmitting means between said disk and said feeding devices, a clutch upon said axle, said clutch adapted to rotate with said axle and to have movement longitudinally of said axle, and means for moving said clutch into and out of connection with the differential gear disk.

9. In a planting machine, the combination of a main driving axle, power transmitting means loosely mounted upon said axle, a clutch adapted to establish communication between said axle and said power transmitting means, a shaft, a series of levers secured to said shaft, a series of planting devices, connections between each of said planting devices and one of said levers, connection between said clutch and said shaft, and a hand lever by which said shaft may be turned, whereby movement of said shaft and hand lever will simultaneously move the planting devices and the clutch.

10. In a planting machine, the combination of a main frame, a series of planting devices supported thereby, draft means at the forward end of the frame by which it may be drawn over the ground, a stationary axle, a wheel at each end of said axle, said wheels being adapted to be swung in a horizontal plane, means for steering said wheels whereby the turning of the draft means may be compensated and the planting devices made to travel substantially in straight lines, connecting means removably secured to said stationary axle, and a series of braces each hingingly secured at one of its ends to said last-named means and secured at its opposite end to one of the planting devices.

THEODOR UMRATH.

Witnesses:
G. Y. SKINNER,
C. L. HOPKINS.